Figure 3:
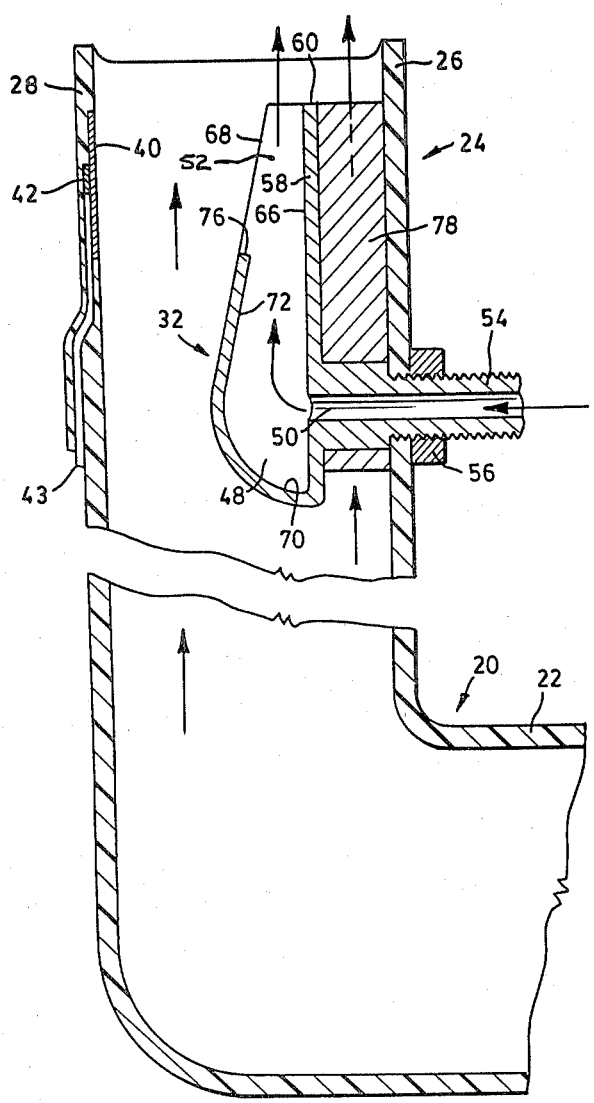

United States Patent [19]

Inculet et al.

[11] 4,396,157

[45] Aug. 2, 1983

[54] NOZZLE FOR SPRAYING APPARATUS

[75] Inventors: Ion I. Inculet; Terry E. Base, both of London, Canada

[73] Assignee: Elstat Limited, London, Canada

[21] Appl. No.: 244,556

[22] Filed: Mar. 17, 1981

[51] Int. Cl.³ .............................................. B05B 1/00

[52] U.S. Cl. .............................................. 239/598

[58] Field of Search .................. 239/77, 78, 499, 589, 239/592–595, 597, 598, 601

[56] References Cited

U.S. PATENT DOCUMENTS 3,504,854 4/1970 De Kinkelder ...................... 239/78

*Primary Examiner*—Andres Kashnikow

[57] ABSTRACT

A nozzle for spraying apparatus to distribute crop treatment liquid. The nozzle is of general ogee shape with a base and an upper wall spaced from the base and connected to it by side walls. The upper wall extends from the apex of the base partially along the base to terminate in a trailing edge. The nozzle is placed in a high velocity air stream and liquid introduced between the base and upper wall. The high velocity airstream atomizes the liquid and distributes it in the surrounding environment. The nozzle is particularly useful in electrostatic spraying apparatus and may be made of plastics material to inhibit induction of electrostatic charge on the nozzle.

11 Claims, 4 Drawing Figures

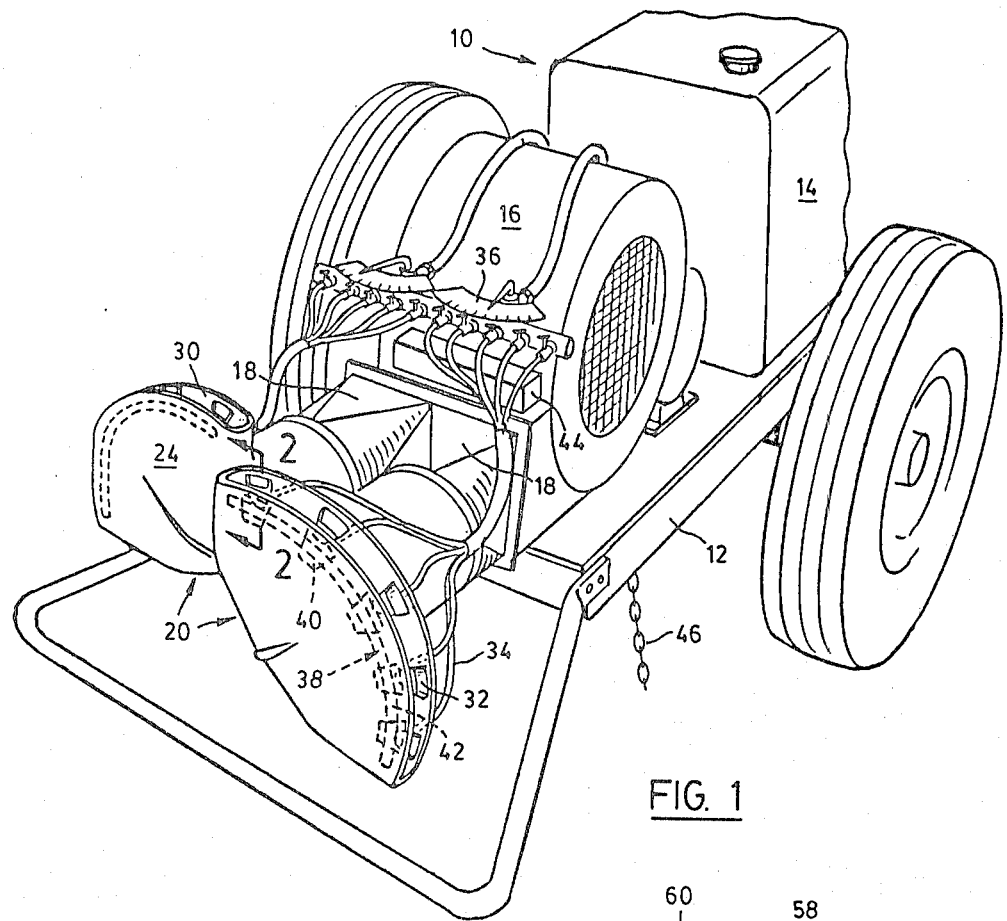
FIG. 1
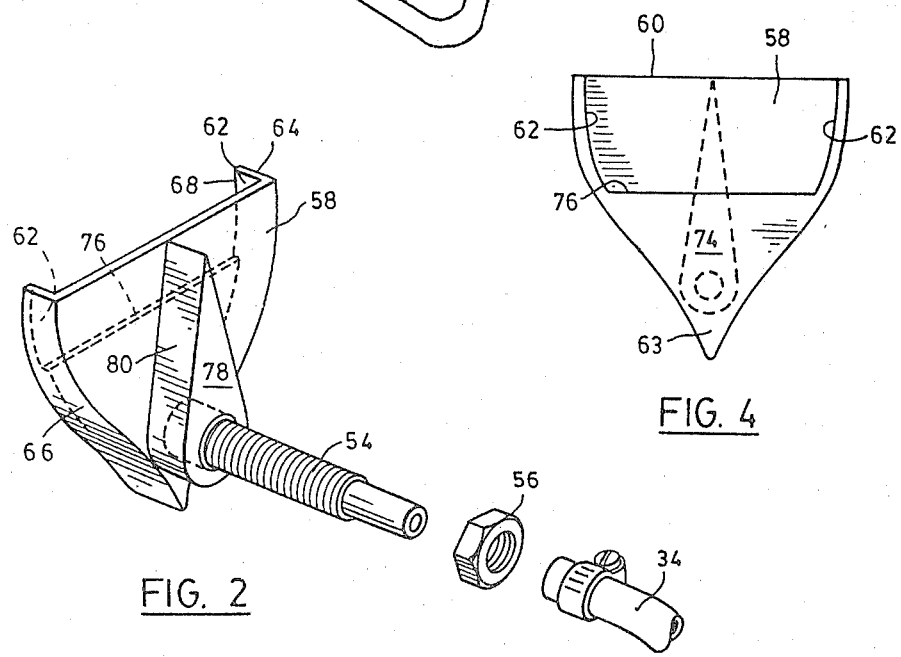
FIG. 2
FIG. 4

NOZZLE FOR SPRAYING APPARATUS

The present invention relates to liquid sprayers and more particularly to liquid dispensing nozzles used in such sprayers.

Spraying apparatus is known in which a high velocity air stream is used to atomise a liquid issuing from a nozzle for subsequent deposition on a crop or plant.

Such a device is shown in U.S. Pat. No. 3,504,854 to R. J. A. DeKinkelder where liquid is dispensed from a plurality of nozzles located within a flared outlet duct. The duct is supplied with a high velocity air stream which atomises and entrains liquid being dispensed from the nozzles and carries the liquid into the atmosphere in the region of the crop being sprayed. This device has been commercially exploited and provides an improvement over previously known devices.

As an improvement of the Kinkelder apparatus it has been proposed to charge electrostatically the droplets as they pass through the outlet duct and thereby improve the deposition of the droplets on the crop. This has been achieved by an electrode placed in the duct facing the nozzles and connected to one terminal of a high voltage source. The other terminal of the source is connected through the apparatus to ground. An electric charge is induced on the droplets as they are formed in the duct. The charged droplets are attracted electrostatically to the leaves of the crop being sprayed. This has improved the deposition of liquid droplets on the crop and increased the efficiency of the spraying apparatus.

It has now been recognised that the nozzles previously used in the spraying apparatus hinder the efficient transfer of charge to the droplets as an electrostatic charge is partly induced on the metal used to form the nozzle.

According therefore to a first aspect of the invention there is provided, for use in an electrostatic liquid spraying apparatus which transfers electrostatic charges to liquid droplets entrained in an air stream, a nozzle to dispense liquid droplets, said nozzle having a body including a liquid inlet to receive liquid and an outlet to dispense liquid into said air stream, said body being formed from a non conducting material.

A further problem associated with both the previously proposed apparatus and that shown in the Kinkelder patent is control of the droplet size generated by the nozzle, since, for accurate distribution of the liquid, it is clearly desirable to produce droplets of uniform size. The previously used nozzles, as illustrated in FIG. 3 of the Kinkelder patent, have relied upon impingement of the liquid on a transverse lip to atomise the liquid. It has now been found that improved droplet formation may be obtained by utilizing turbulence over one of the faces of a nozzle.

According therefore to a further aspect of the invention there is provided a spray nozzle constituted by a hollow body having a liquid inlet and a liquid outlet to permit passage of fluid through said body, said body being formed from a base delimited by an upper edge and a pair of side edges, each of said side edges being defined by an ogee shape, said side edges converging and intersecting at a location spaced from said upper edge to define an apex of said base; a pair of side walls, each extending along a respective one of said side edges generally perpendicular to said base and having an inner edge connected to said respective one of said side edges and an outer edge, said outer edge having a radiused portion intersecting said inner edge at said apex of said base and a planar portion continuing from said radiused portion toward said upper edge of said base in spaced relationship from said inner edge; and an upper wall extending from said apex between said outer edges of said side walls to overlie a portion of said base and terminating in a trailing edge located intermediate said apex and said upper edge, the area between said trailing edge, said side walls and said base defining said liquid outlet.

An embodiment to the invention will now be described by way of an example only with reference to the accompanying drawings in which:

FIG. 1 shows a rear perspective view of a portion of a liquid spraying apparatus, FIG. 2 is a view taken on the line 2—2 of FIG. 1 and, FIG. 3 is a rear perspective view of a nozzle shown in FIG. 2, FIG. 4 is a front elevation of the nozzle of FIG. 3.

Referring now to the drawings, spraying apparatus 10 comprises a trailed chassis 12 upon which is mounted a liquid reservoir 14 and a fan 16 to provide a source of pressurized air. The fan 16 may be driven either by the power take-off of a tractor which is conventionally used to draw the spraying apparatus or by a separate prime mover mounted on the trailer. The outlet from the fan 16 is directed to a pair of outlet ducts 18 mounted on the rear of the trailed chassis 12. Each of the ducts 18 includes a fan shaped shroud 20, each of which is adjustably mounted on the outlet ducts for rotation about a generally longitudinal axis.

The shroud 20 can best be seen with reference to FIG. 2 and comprises a tubular duct 22 connected to a fan shaped terminal portion 24. The terminal portion 24 includes a forward wall 26 and a trailing wall 28. The forward and trailing walls are interconnected along their edges to provide a single elongated outlet mouth 30. Air is therefore blown by the fan along the tubular duct 22 and through the terminal portion 24 out of the outlet mouth 30. The shroud 20 is dimensioned to provide a high velocity air flow in the region of the fan shaped terminal portion, typically in the order of 100 to 250 miles per hour.

A number of nozzles 32, five in the example shown, are located on the forward wall 26 of the shroud. Each nozzle is connected to the liquid reservoir 14 by pipes 34 which are controlled by metering valves 36. On the trailing wall 28 of the terminal portion 24, there is embeded flush an electrode 38 which is formed out of a plurality of petals 40 interconnected by a conducting strip 42. Each of the petals 40 is located opposite a respective nozzle 32 so that fluid issuing from the nozzle will pass the petal. The petals 40 are typically of sector shape and are made from a conducting material which may be either a metal or a conducting plastics material. Power is supplied to the electrode 38 by means of a high tension cable 43 embedded within the trailing wall 28 and connected to a high voltage power pack 44 mounted on the chassis adjacent the fan 16. The high tension power pack is grounded through the vehicle chassis and a trailing conductor 46 so as to be at the same potential as the surrounding environment.

The nozzle 32 is best seen with reference to FIGS. 3 and 4 and comprises a body 48 with a fluid inlet 50 and a fluid outlet 52. The nozzle 32 is formed from a plastic material, preferably by moulding, so that in operation, with a potential being applied to the electrode 38, charge does not accumulate on the nozzle. The plastics material may be an Acetal Resin such as that sold under the trade name Delrin by Du Pont although any suitable form of non-conducting plastics material may be used. The inlet 50 is formed by a tubular conduit 54 passing through the forward wall 26 to receive a pipe 34. A nut 56 is threaded onto the outer surface of the conduit 54 to secure the nozzle to the forward wall 26. The body is formed with a base 58 which is delimited by an upper edge 60 and a pair of side edges 62. Each of the side edges is shaped in the form of an ogee shape and the side edges 62 converge and intersect at a location spaced from the upper edge to define an apex 63 for the base 58. A pair of sides walls 64 are connected to the side edges and extend generally perpendicular from the base. Each side wall comprises an inner edge 66 which is connected to a respective one of the side edges 62 and an outer edge 68. The outer edge is defined by a radius portion 70 which intersects the inner edge 66 at a location corresponding to the apex 63. The outer edge is continued by a planar portion 72 which converges with the inner edge 66 toward the upper edge 60 of the base 58.

An upper wall 74 extends from the apex 63 toward the upper edge 60 of the base 58. The upper wall 74 is connected to the outer edges of the side walls 64 and terminates in a trailing edge 76 located intermediate the apex 63 and the upper edge 60. The planar portion and radius portion of the outer edge are non-tangential so that an abrupt change in the surface of the upper wall 74 occurs to promote turbulence on the upper wall 74.

A strengthening or spacer member 78 is provided on the outer surface of the base 58 and may be integrally formed with the base 58. The strengthening member 78 is generally tear shaped and extends around the conduit 54 and up to the upper edge 60. The member 78 is of uniform depth so that the base 58 is maintained a constant spacing from the trailing wall 28 of the shroud 20 but side surfaces 80 of the strengthening member converge and intersect at a location corresponding to the upper edge 60. The member 78 therefore provides a streamlined flow of air around the conduit 54 so that air passing between the base 58 and the forward wall 26 maintains an undisturbed high velocity flow.

By contrast, turbulence is created in the air passing over the upper wall face 74 and a pair of contra-rotating vortices are formed at opposite ends of the trailing edge 76.

In operation, air is delivered from the fan through the outlet duct 18 and attains a high velocity in the fan shaped terminal portion 24. An electrostatic charge is applied to the electrode 38 and liquid is delivered from the reservoir through the pipes 34 to the inlet 50 of the nozzle 32. Air passing over the upper wall 74 atomizes the liquid delivered to the nozzle to provide droplets which are of a uniform size. The droplets acquire a charge as they pass the petals 40 and are carried by the high velocity air stream out of the elongated outlet mouth 30. The electrostatic charge encourages the deposition of the droplets on the crop to be sprayed to obtain a more uniform distribution and more complete coverage of the liquid.

It has been found that the particular form of nozzle shown enables a smaller and more uniform droplet size to be obtained. A series of tests were conducted to determine the relative performance of the nozzle shown in the present application and that conventionally used and shown in the Kinkelder patent. The results are set out in the chart below and it will be seen that a smaller mean diameter of the droplets is obtained with a reduced standard deviation of the size of the particles. At the same time, it will be seen that the droplets charged in the Ogee nozzle acquire greater charges; the charge to mass ratios expressed in $$\frac{\text{(microcoulomb)}}{\text{grams}}$$

as well as the total charge accumulated in a Faraday pail in which the droplets were collected for a period of 30 seconds (expressed in microcolumb) were greater for the Ogee nozzle.

| | VARIOUS TESTS OGEE SHAPED PLASTIC | | | | | |
|---|---|---|---|---|---|---|
| | Voltage "On" | | | Voltage "Off" | | |
| Number of particles | 12 | 308 | 189 | 6 | 49 | 200 |
| Mean diameter (Mm) | 74 | 66 | 28 | 60 | 95 | 28 |
| Standard deviation (um) | 31 | 77 | 36 | 25 | 118 | 32 |
| (Average results for dimensions) | | | | | | |
| Total # of particles | | 499 | | | 255 | |
| Mean diameter | | 51 | | | 61 | |
| Standard deviation | | 63 | | | 69 | |
| Charge to mass ratios n c/g | 6.8 | 5.6 | 6.1 | | | |
| Average value n c/g | | 6.2 | | | | |
| Charge collected IM a Faraday Pail (Mc) | 0.32 | 0.34 | 0.34 | | | |
| (−) uc (average) | | 0.33 | | | | |

| | VARIOUS TESTS KINKELDER METAL | | | | | |
|---|---|---|---|---|---|---|
| | Voltage "On" | | | Voltage "Off" | | |
| Number of particles | 11 | 315 | 172 | 13 | 88 | 152 |
| Mean diameter (um) | 109 | 88 | 36 | 69 | 126 | 37 |
| Standard deviation (um) | 129 | 98 | 42 | 78 | 149 | 42 |
| (Average results for dimensions) | | | | | | |
| Total # of particles | | 498 | | | 253 | |
| Mean diameter | | 69 | | | 70 | |
| Standard deviation | | 82 | | | 93 | |
| Charge to mass Ratios n c/g | 6.3 | 5.4 | 5.6 | | | |
| Average value n c/g | | 5.8 | | | | |
| Charge collected in a Faraday Pail (um) | 0.33 | 0.26 | 0.23 | | | |
| (−) um (average) | | 0.27 | | | | |

The location of the upper surface trailing edge along the root chord, that is the distance between the upper edge 60 and the apex 63 is significant. It is preferred that the distance between the upper edge and the upper wall surface trailing edge should lie in the range 0.2 to 0.8 of the root chord of the nozzle and particularly beneficial results are being obtained with the upper wall surface trailing edge located a distance of 0.44 of the root cord from the upper edge.

In a typical application, a nozzle having the following dimensions was used to advantage, these dimensions being for example only,

| | |
|---|---|
| Width of upper edge 60 | $1\frac{7}{8}$ in. |
| Root chord | $1\frac{3}{4}$ in. |
| Width of upper wall surface trailing edge | $1\frac{1}{2}$ in. |
| Radius of curved portion | $\frac{1}{2}$ in. |

It is believed that the improved performance of the nozzle is obtained by the controlled turbulence generated over the upper wall, which may be attributed partly to the abrupt transition between the radiused and planar portions of the front wall and partly to the uniform streamlined airflow that occurs over the base of the nozzle which maintains the mean velocity of the air passing through the shroud as great as practical. It will of course be appreciated that the particular shape of nozzle disclosed may be used in a conventional spraying apparatus that does not utilize the electrostatic charging of the droplets and at such situations the nozzle may be formed from a metal. Similarly, the use of plastics material to form the body of the nozzle may be used to advantage with conventionally shaped nozzles currently used in electrostatic sprayers. The non conducting material inhibits the build up of charge on the nozzle resulting in an increased charge on the droplets and a reduction in electric power consumption.

What we claim is:

1. A spray nozzle constituted by a hollow body having a liquid inlet and a liquid outlet to permit passage of fluid through said body, said body being formed from a base, delimited by an upper edge and a pair of side edges, each of said side edges being defined by an ogee shape, said side edges converging and intersecting at a location spaced from said upper edge to define an apex of said base, a pair of side walls, each extending along a respective one of said side edges generally perpendicular to said base and having an inner edge connected to said respective one of said side edges and an outer edge, said outer edge having a radiused portion intersecting said inner edge at said apex of said base and a planar portion continuing from said radiused portion toward said upper edge of said base in spaced relationship from said inner edge and an upper wall extending from said apex between said outer edges of said side walls to overlie a portion of said base and terminating in a trailing edge located intermediate said apex and said upper edge, the area between said trailing edge, said side walls and said base defining said liquid outlet.

2. A spray nozzle according to claim 1 wherein said liquid inlet is located in said base and includes a tubular conduit projecting from said base away from said upper wall.

3. A spray nozzle according to claim 2 wherein a rib is formed on an outer surface of said base.

4. A spray nozzle according to claim 3 wherein said conduit passes through said rib.

5. A spray nozzle according to claim 4 wherein said rib is tear shaped to provide a streamlined surface around said conduit.

6. A spray nozzle according to claim 5 wherein said conduit is located adjacent to the apex of said base and said rib extends to said upper edge.

7. A spray nozzle according to claim 6 wherein said rib progressively converges to an edge located at said upper edge and perpendicular thereto.

8. A spray nozzle according to claim 1 wherein said planar portion of said inner edge is chordal to said radiused portion to provide an abrupt transition in said upper wall.

9. A spray nozzle according to claim 8 wherein said planar portion of said outer edge and said inner edge converge in the direction of said upper edge of said base.

10. A spray nozzle according to claim 1 wherein the distance of said upper wall surface trailing edge from said upper edge is in the range 0.2 to 0.8 of the distance from said upper edge to said apex.

11. A spray nozzle according to claim 10 wherein the distance of said upper wall surface trailing edge to said upper edge is 0.44 the distance from said upper wall surface trailing edge to said apex.

* * * * *